United States Patent
Su et al.

(10) Patent No.: US 8,408,981 B2
(45) Date of Patent: Apr. 2, 2013

(54) EXHAUST DEVICE

(75) Inventors: Heng-Yung Su, Sinjhuang (TW); Yao-Shih Leng, Taipei (TW)

(73) Assignee: MSI Computer (Shenzhen) Co., Ltd. (CN)

( * ) Notice: Subject to any disclaimer, the term of this patent is extended or adjusted under 35 U.S.C. 154(b) by 1145 days.

(21) Appl. No.: 12/333,750

(22) Filed: Dec. 12, 2008

(65) Prior Publication Data

US 2010/0089549 A1    Apr. 15, 2010

(30) Foreign Application Priority Data

Oct. 15, 2008   (TW) ................................ 97139575 A

(51) Int. Cl.
*F28F 7/00*   (2006.01)

(52) U.S. Cl. ........ 454/358; 454/184; 454/333; 454/334; 454/335; 454/319; 454/320; 361/679.46; 361/688; 361/690; 165/104.34

(58) Field of Classification Search ............... 454/184, 454/319–320, 333–335, 358; 361/678.46–679.51, 361/688, 690; 165/104.34
See application file for complete search history.

(56) References Cited

U.S. PATENT DOCUMENTS

| | | | | |
|---|---|---|---|---|
| 3,811,369 | A | * | 5/1974 | Ruegg ............................ 454/304 |
| 5,194,043 | A | * | 3/1993 | Takahashi et al. ............ 454/316 |
| 5,660,588 | A | * | 8/1997 | Kotoh et al. ................... 454/285 |
| 6,229,701 | B1 | * | 5/2001 | Kung et al. .................... 361/688 |
| 6,974,378 | B2 | * | 12/2005 | Osada et al. ................... 454/155 |
| 7,031,154 | B2 | * | 4/2006 | Bash et al. ..................... 361/690 |
| 7,597,616 | B2 | * | 10/2009 | Browne et al. ................ 454/155 |
| 2006/0172694 | A1 | * | 8/2006 | Gau et al. ....................... 454/333 |
| 2009/0321047 | A1 | * | 12/2009 | Chen ............................ 165/80.3 |

FOREIGN PATENT DOCUMENTS

| | | | | |
|---|---|---|---|---|
| JP | 58214737 | A | * | 12/1983 |
| JP | 60228844 | A | * | 11/1985 |
| JP | 61149756 | A | * | 7/1986 |
| JP | 61149757 | A | * | 7/1986 |
| JP | 63070042 | A | * | 3/1988 |
| JP | 63271048 | A | * | 11/1988 |
| JP | 63315849 | A | * | 12/1988 |
| JP | 01310254 | A | * | 12/1989 |

* cited by examiner

*Primary Examiner* — Steven B McAllister
*Assistant Examiner* — Ko-Wei Lin
(74) *Attorney, Agent, or Firm* — Stevens & Showalter LLP

(57) ABSTRACT

An exhaust device applied to an electronic device is described. Memory deformable elements of the exhaust device are heated to shrink, and meanwhile, guide vanes located on an air outlet are driven to rotate and swing back and forth between a left outlet position and a right outlet position, such that the exhaust device reciprocatively changes an outlet position without requiring any external power.

8 Claims, 13 Drawing Sheets

EXHAUST DEVICE

CROSS-REFERENCE TO RELATED APPLICATIONS

This non-provisional application claims priority under 35 U.S.C. §119(a) on Patent Application No(s). 097139575 filed in Taiwan, R.O.C. on Oct. 15, 2008 the entire contents of which are hereby incorporated by reference.

BACKGROUND OF THE INVENTION

1. Field of the Invention

The present invention relates to an exhaust device, and more particularly to an exhaust device capable of reciprocatively changing an outlet direction by using a temperature variation.

2. Description of Related Art

With the rapid progress of the electronic technique, various electronic products have developed towards the trend of being light, thin, short, and small. However, as the volume of the electronic product is greatly reduced, a problem of high heat exhaust occurs to various electronic devices. As for a computer, an electronic device, or a TV set, a heat sink fan is generally installed in the cases thereof, so as to solve the problem that heat sources are over-heated, for example, a chip, a central processing unit (CPU), an integrated circuit, and the like. Taking notebook computers for example, in most notebook computers, a heat sink fan is disposed within a host, an air inlet is disposed on a top surface or a bottom surface of the host, and an air outlet is disposed on a side edge of the host. Once the host begins to operate, the heat sink fan absorbs ambient cold air via the air inlet, and after the cold air performs heat exchange with a heat source (for example, CPU) of the notebook computer, the heat sink fan blows out the hot air via the air outlet.

In order to prevent foreign substances from entering the notebook computer from the air inlet or the air outlet, a plurality of fixed fins may be disposed at the air inlet or the air outlet, and most of the fins are vertical to the surface of the mainframe, such that the direction along which the air is blown out via the air outlet is vertical to the surface of the mainframe. For example, the air outlet of the notebook computer is disposed on the side edge of the host, and a user needs to place his/her hand on the side edge of the notebook computer where the air outlet is disposed (for example, when using a mouse), and thus, in this manner, the hot air blown out via the air outlet is directly blown to the user's hand, and as a result, a user may feel discomfortable.

Definitely, in order to solve the above problem, one of the feasible manners lies in that the air outlet of the notebook computer is designed as adjustable fins. For example, in the U.S. Pat. No. 6,229,701, a structure of heat dissipating slats at a ventilation hole of a notebook computer is disclosed, in which the heat dissipating slats are movably disposed at the ventilation hole, and the slats may overlap to close the ventilation hole or may form clearances at a certain angle under the control of a user. However, in the U.S. Pat. No. 6,229,701, the manner for adjusting the heat dissipating slats is quite complicated in terms of structure, and during operation, a user must control the angle of the heat dissipating slats so as to change the direction of the air blown out via the ventilation hole. If it intends to make the heat dissipating slats to swing back and forth at the ventilation hole, it may result in inconveniences in operation, or an electrical device (for example, a motor or a rotating shaft) is further required to be disposed on the heat dissipating slats, so as to enable the heat dissipating slats to swing back and forth, thereby resulting in an additional power consumption.

SUMMARY OF THE INVENTION

In view of the above problems, the present invention is directed to an exhaust device, which is capable of automatically changing an exhaust direction according to a temperature effect, thereby solving the problem of a conventional electronic device that a hot air is guided to be blown out via the air outlet merely along a fixed direction, or the direction along which the air is blown out needs to be adjusted and changed manually.

An exhaust device is provided according to the present invention, which is applied to an electronic device. A case of the electronic device has an air flow channel provided for a hot air flow to pass there through. The exhaust device includes a plurality of vanes, a first memory deformable element, a second memory deformable element, and a braking part. The vanes include a left vane and a right vane located on two sides. Each vane is rotatably disposed on an air outlet of the case. The braking part is connected to each vane, such that each vane is rotatable and interlocked with each other. The vanes include a left outlet position and a right outlet position. The first memory deformable element is connected to the right vane, and when the vanes are located on the left outlet position, the right vane shields the first memory deformable element, such that the first memory deformable element is not heated by the hot air flow. The second memory deformable element is connected to the left vane, and when the vanes are located on the right outlet position, the left vane shields the second memory deformable element, such that the second memory deformable element is not heated by the hot air flow. In this way, the first memory deformable element and the second memory deformable element are alternately shielded by the right vane or the left vane, or alternately heated by the hot air flow, such that the first memory deformable element and the second memory deformable element are alternately switched between a stretched/deformed state and a shrunk/restored state, so as to pull the vanes to rotate and swing back and forth between the left outlet position and the right outlet position.

In the exhaust device according to the present invention, one of the first memory deformable element and the second memory deformable element may be replaced by an extension spring. The other memory deformable element is connected to the right vane, and when the vanes are located on the left outlet position, the right vane shields the memory deformable element, such that the memory deformable element is not heated by the hot air flow. The extension spring is connected to the left vane, and when the vanes are located on the right outlet position, the left vane shields the extension spring. The memory deformable element and the extension spring are alternately shielded by the right vane or the left vane, or the memory deformable element is alternately heated by the hot air flow, such that the memory deformable element is alternately switched between a stretched/deformed state and a shrunk/restored state, so as to pull the vanes to rotate and swing back and forth between the left outlet position and the right outlet position.

In the exhaust device according to the present invention, when the disposed electronic device operates to produce heat energy, the memory deformable element is heated to be shrunk, so as to push the plurality of vanes to rotate and swing back and forth between the left outlet position and the right outlet position, such that the plurality of vanes may change the exhaust direction reciprocatively according to the temperature effect of the operation of the electronic device, which thus becomes a design with both heat dissipation and power-saving functions applied to the electronic device.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

An exhaust device according to the present invention is applied to an electronic device, in which the electronic device refers to, for example, a desktop computer, a server, a notebook computer, an electrical heater, and other electronic device generating heat energy in an operating state. The devices listed above are only taken as examples, but the present invention is not limited hereby. In the following specific embodiments, the notebook computer is taken as the electronic device in the present invention. Left and right directions used in the present invention refer to relative directions from an interior of a host of the electronic device towards an exterior of the host, that is, left and right sides from a position of a heat sink fan towards an air flow channel.

Figure 1:
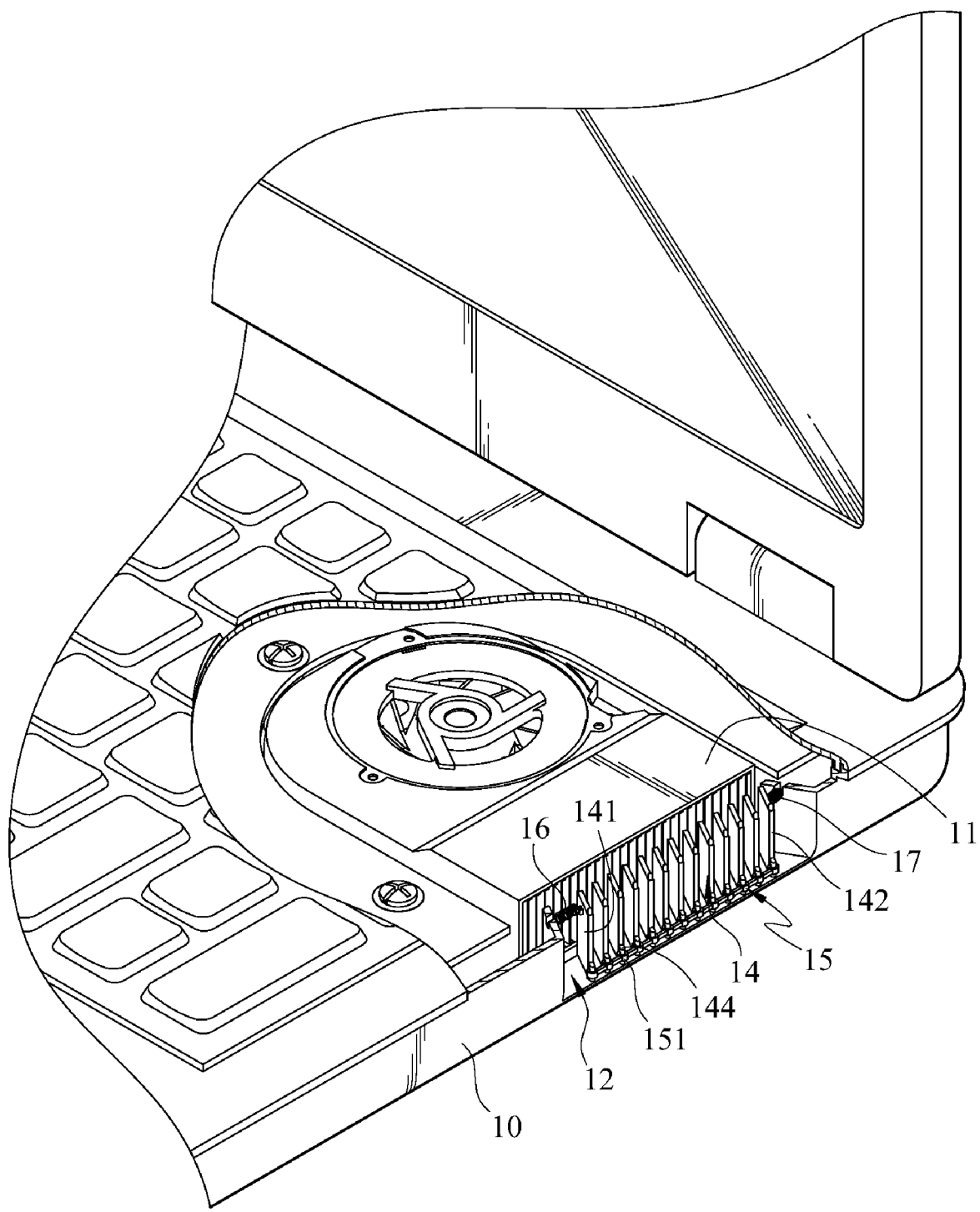
FIG. 1 is a schematic view of a structure of a first embodiment of the present invention applied to a notebook computer.

FIG. 1 shows an exhaust device according to the present invention, which is applied to a notebook computer. The notebook computer includes a host 10, the host 10 has a heat sink fan 11 therein, and an air flow channel 12 corresponding to the heat sink fan 11 is disposed on a side edge of the host 10.

Figure 2:
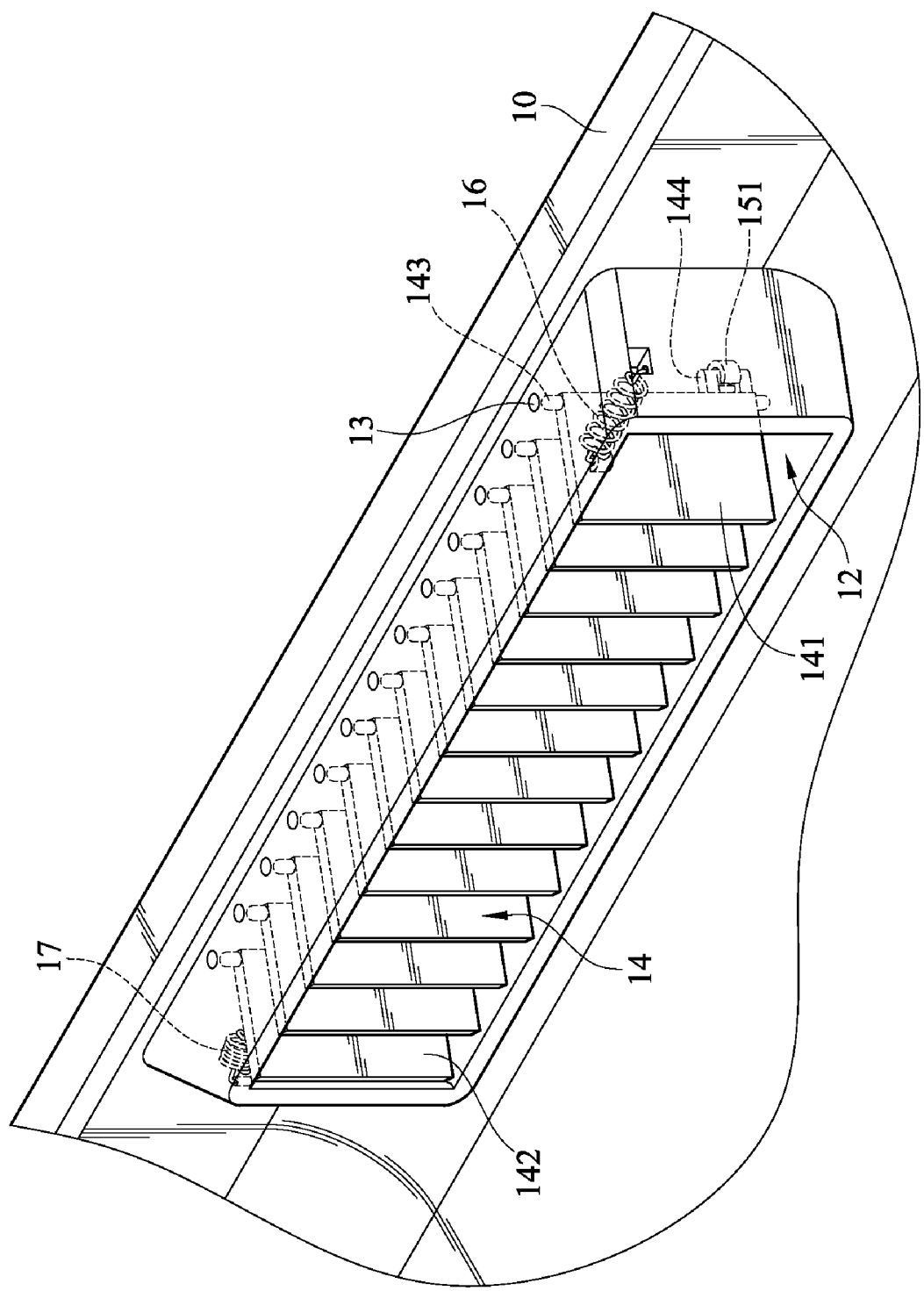
FIG. 2 is a schematic view of a structure of the first embodiment of the present invention.

Referring to FIG. 2, the exhaust device according to a first embodiment of the present invention includes a plurality of vanes 14, a braking part or linking part 15 for linking the vanes 14 together, a first memory deformable element 16, and a second memory deformable element 17. The vanes 14 include a right vane 141 and a left vane 142 close to the air flow channel located on two sides. Each vane 14 is a sheet-shaped body. A pair of rotating shafts 143 is respectively disposed on a top end and a bottom end of each vane 14. A plurality of sleeve holes 13 is respectively disposed on a top end and a bottom end of an inner wall surface of the air flow channel 12. The rotating shafts 143 of the vanes 14 are sleeved in sleeve holes 13 of the air flow channel 12, such that the vanes 14 rotate on the air flow channel 12 to change an angle thereof. A connecting portion 144 is further disposed on a long side of each vane 14. The braking part 15 is a strip-shaped rod, and is provided with a plurality of sleeves 151 corresponding to each vane 14, and the connecting portion 144 of each vane 14 is made to swing on each sleeve 151, so as to serially connect each vane 14, and thus each vane 14 can be interlocked with each other and rotate together to change the angle thereof.

One end of the first memory deformable element 16 is connected to the right vane 141, and the other end is fixedly disposed on the inner wall surface of the air flow channel 12 close to the right vane 141. One end of the second memory deformable element 17 is connected to the left vane 142, and the other end is fixedly disposed on the inner wall surface of the air flow channel 12 close to the left vane 142. The memory deformable elements 16, 17 and the vanes 14 are connected in such a way that the memory deformable elements 16, 17 may pull all the vanes 14 to swing together once the memory deformable elements 16, 17 are heated to be deformed.

The memory deformable elements may be made of nickel-titanium shape-memory alloy, or made of copper-zinc-aluminum shape-memory alloy, or copper-nickel-aluminum shape-memory alloy etc., which may generate a deforming effect according to the temperature. Under a normal temperature, the memory deformable element is extended and is in a stretched/deformed state, and under a heated state, the memory deformable element is in a shrunk/restored state. Through the deforming effects of the memory deformable elements, a memory deformable element with a stretched/deformed state as an initial state and a memory deformable element with a shrunk/restored state as an initial state are used, thereby achieving alternate deforming effects during operation.

In the first embodiment of the present invention, under the initial state (for example, the heat sink fan does not work), the first memory deformable element 16 is in the stretched/deformed state, the second memory deformable element 17 is in the shrunk/restored state, the vanes 14 are maintained on the right outlet position, and the left vane 142 leans against the side edge of the inner wall surface of the air flow channel 12 and shields the second memory deformable element 17, such that the air convention in the air flow channel 12 flowing to the second memory deformable element 17 is blocked by the left vane 142.

Figure 3A:
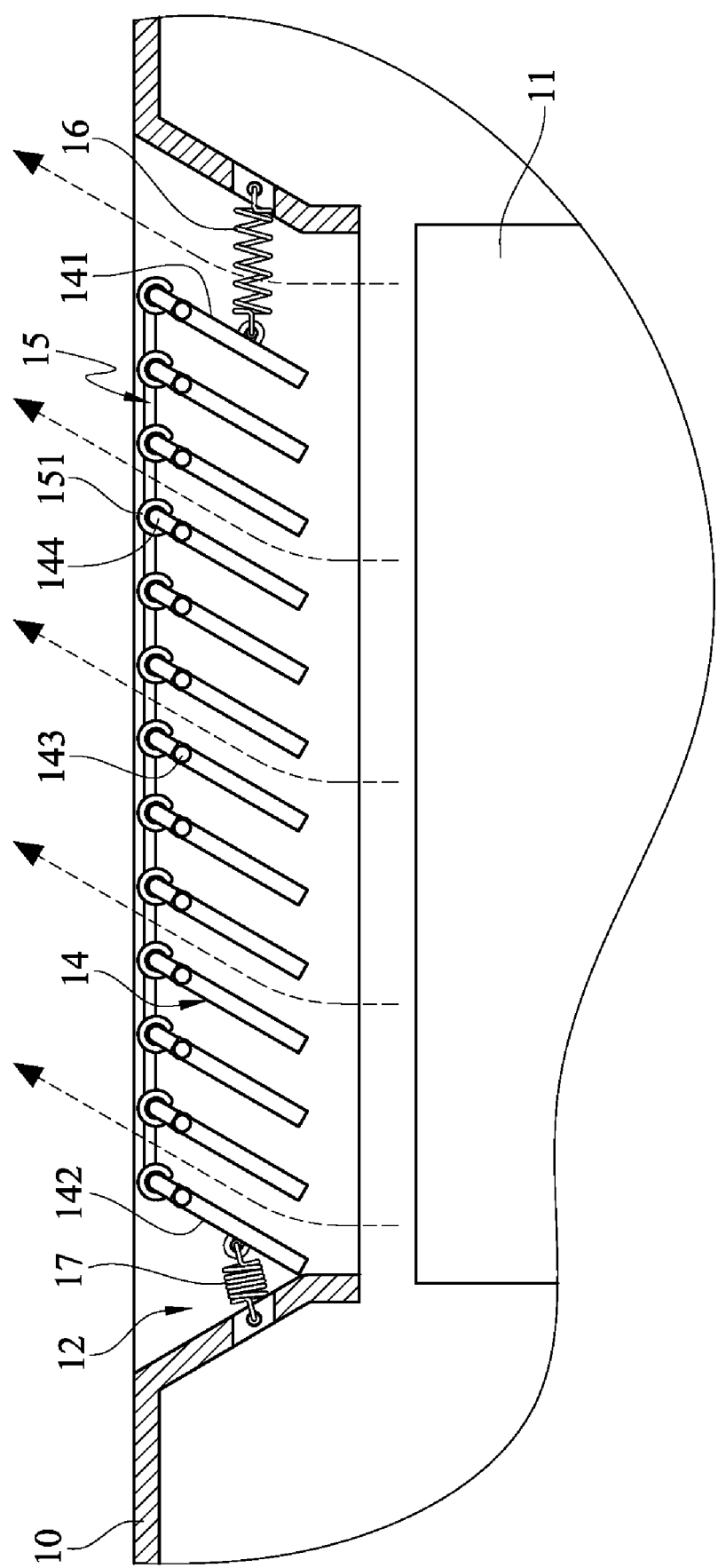
FIG. 3A is a schematic view of motions of the first embodiment of the present invention.
Figure 3B:
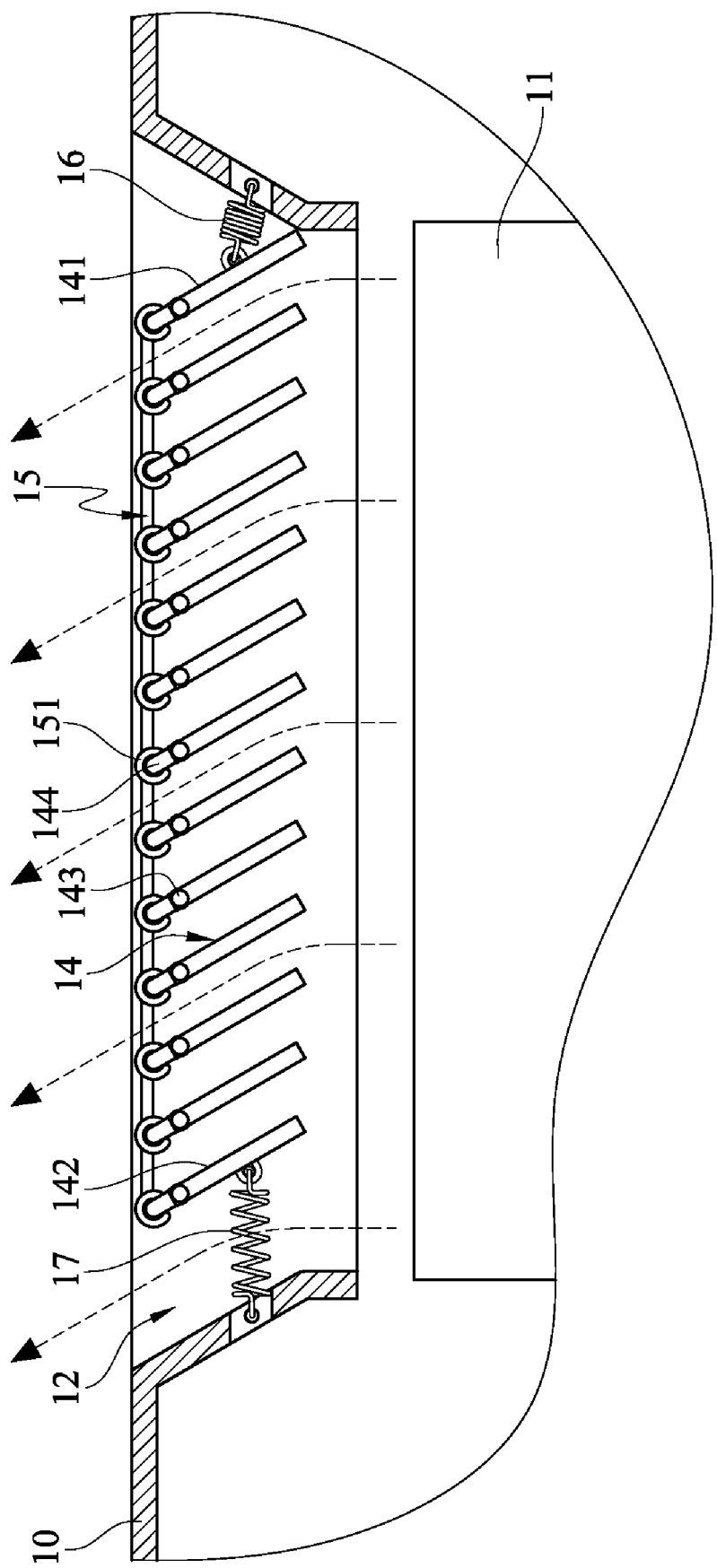
FIG. 3B is a schematic view of usage of the first embodiment of the present invention.

Referring to FIGS. 3A and 3B, in the exhaust device according to the first embodiment of the present invention, the plurality of vanes 14 is rotatably disposed on the air flow channel 12, and the braking part 15 is connected to each vane 14. One end of the first memory deformable element 16 is connected to the right vane 141, and the other end is fixedly disposed on the inner wall surface of the air flow channel 12 close to the right vane 141. One end of the second memory deformable element 17 is connected to the left vane 142, and the other end is fixedly disposed on the inner wall surface of the air flow channel 12 close to the left vane 142. Under a normal temperature, that is, the notebook computer does not begin to work, the first memory deformable element 16 is maintained in the stretched/deformed state, and the second memory deformable element 17 is maintained in the shrunk/restored state. Each vane 14 is maintained on the right outlet position, the left vane 142 leans against the side edge of the inner wall surface of the air flow channel 12 and shields the second memory deformable element 17 (as shown in FIG. 3A), such that the air convention in the air flow channel 12 flowing to the second memory deformable element 17 is blocked.

Once the notebook computer begins to operate, the heat sink fan 11 begins to absorb cold air from the exterior, and after the cold air performs heat exchange with a heat source (not shown) of the notebook computer, the hot air generated after the heat exchange is exhausted to the exterior via the air flow channel 12. Upon being guided by each vane 14, the hot air is exhausted towards the right outlet position, and continuously contacts the first memory deformable element 16, such that the first memory deformable element 16 is in the heated state, and at this time, the second memory deformable element 17 is shielded by the left vane 142, and does not contact the hot air. When the temperature of the first memory deformable element 16 reaches a transition temperature, the first memory deformable element 16 is deformed and shrunk to the shrunk/restored state, that is, the first memory deformable element 16 pulls the right vane 141, and drives each vane 14 through the braking part 15 to swing together to reach the left outlet position, thereby changing the flowing direction of the hot air flow, such that the hot air flow is changed to be exhausted from the left outlet position.

Meanwhile, through the swinging of the left vane 142, the second memory deformable element 17 is extended from the shrunk/restored state to the stretched/deformed state (as shown in FIG. 3B), and contacts the hot air, such that the second memory deformable element 17 is turned to the heated state. When each vane 14 is located on the left outlet position, the right vane 141 leans against the side edge of the inner wall surface on the right side of the air flow channel 12 and shields the first memory deformable element 16, such that the hot air flow is blocked and prevented from contacting the first memory deformable element 16, and thus is guided to the left outlet position by each vane 14.

At this time, when the temperature of the second memory deformable element 17 is raised to the transition temperature due to contacting the hot air, it is shrunk to the shrunk/restored state. The second memory deformable element 17 pulls the left vane 142 to swing, and drives each vane 14 through the braking part 15 to swing together to reach the right outlet position. Meanwhile, the left vane 142 shields the second memory deformable element 17 once again, such that the second memory deformable element 17 is prevented from contacting the hot air (as shown in FIG. 3A), thereby achieving an effect of cooling the second memory deformable element 17. Therefore, the first memory deformable element 16 and the second memory deformable element 17 are alternately heated by the hot air and alternately shielded by the right vane 141 and the left vane 142, such that the first memory deformable element 16 and the second memory deformable element 17 are alternately turned in the stretched/deformed state and the shrunk/restored state. Accordingly, each vane 14 is pulled to swing back and forth between the right outlet position and the left outlet position.

As for specific applications, when the notebook computer just begins to operate, the temperature does not reach the transition temperature yet; the hot air passes through each vane 14 of the air flow channel 12 and is still exhausted towards the right outlet position of the notebook computer. When the notebook computer continuously operates and the temperature of the hot air rises, once the temperature reaches the transition temperature, each vane 14 swings to the left outlet position. The right outlet position and the left outlet position are respectively towards an obliquely front direction or an obliquely back direction of the notebook computer, such that the hot air passing through each vane 14 of the air flow channel 12 is exhausted towards the obliquely front direction or the obliquely back direction of the notebook computer. When a user operates the notebook computer, each vane 14 located on the air flow channel 12 automatically rotates back and forth between the left outlet position and the right outlet position, and it is not necessary for a user to control the exhaust direction of the hot air, which thus is quite convenience.

Figure 4A:
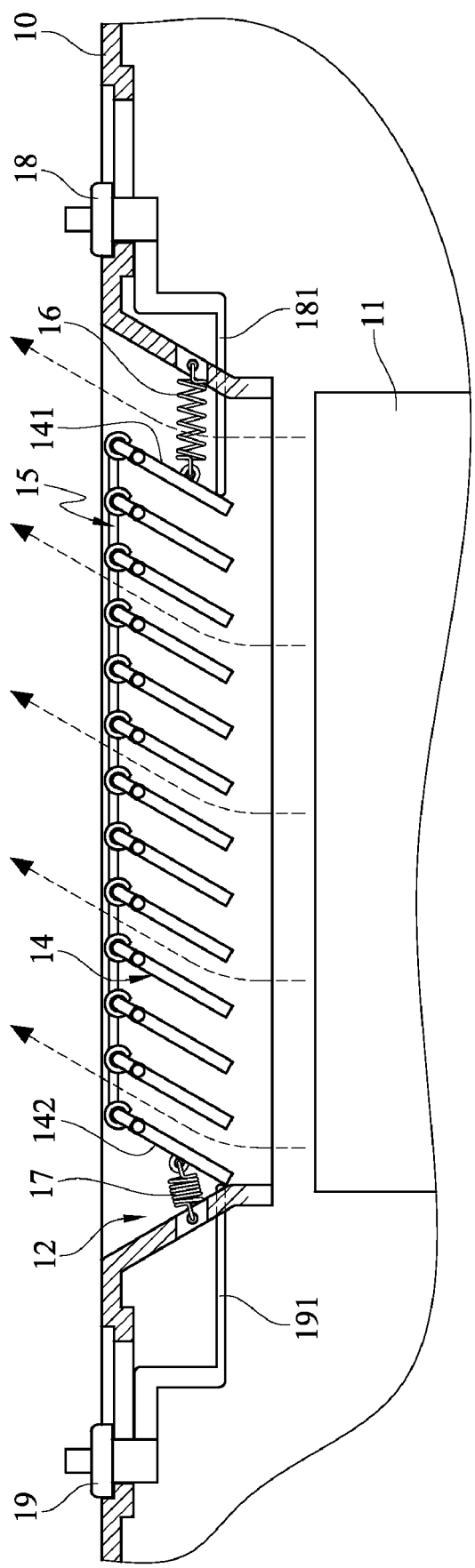
FIGS. 4A and 4B are schematic views of usage of a second embodiment of the present invention.
Figure 4B:
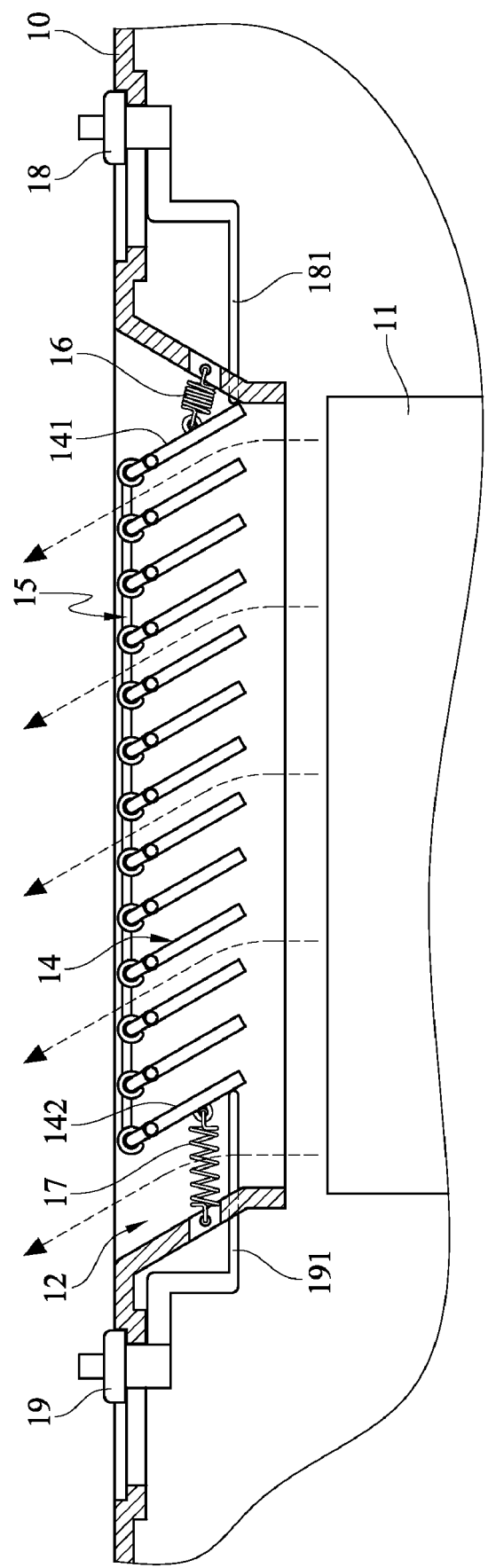

FIGS. 4A and 4B are schematic views of usage of a second embodiment of the present invention. Referring to FIGS. 4A and 4B, as for an exhaust device according to the second embodiment of the present invention, the structure thereof is approximately the same as that of the first embodiment, so only the differences between the two embodiments are described below. In the second embodiment, a control element 18 or 19 is respectively disposed on two sides of the host 10 close to the air flow channel 12. The control elements 18 and 19 have connecting rods 181 and 191 respectively. The connecting rods 181 and 191 respectively penetrate through one side of the air flow channel 12. When the second memory deformable element 17 pulls the left vane 142 to drive each vane 14 to be located on the right outlet position, the second memory deformable element 17 pushes the control element 18 of the host 10 located on the right side of the air flow channel 12, such that the connecting rod 181 passes through the air flow channel 12 and forces the right vane 141 to bear against the right outlet position (as shown in FIG. 4A).

Therefore, when the first memory deformable element 16 is heated by the hot air and intends to restore the shrunk state from the stretched state, the restoring force of the first memory deformable element 16 cannot overcome the pushing force of the control element 18, such that the right vane 141 cannot be pulled. Meanwhile, due to the interlocking relation between the right vane 141 and the other vanes 14, the vanes 14 are forced to bear against the right outlet position.

Similarly, when the first memory deformable element 16 pulls the right vane 141 to drive the vanes 14 to be located on the left outlet position, the first memory deformable element 16 pushes the control element 19 of the host 10 located on the left side of the air flow channel 12, such that the connecting rod 191 passes through the air flow channel 12 and forces the left vane 142 to bear against the left outlet position (as shown in FIG. 4B). Furthermore, the restoring force of the second memory deformable element 17 cannot overcome the pushing force of the control element 19, such that the vanes 14 are forced to bear against the left outlet position.

Therefore, the right vane 141 or the left vane 142 is forcedly pushed by the control elements 18 and 19, such that a user can easily fix the outlet position of the hot air on the right outlet position or the left outlet position.

Figure 5A:
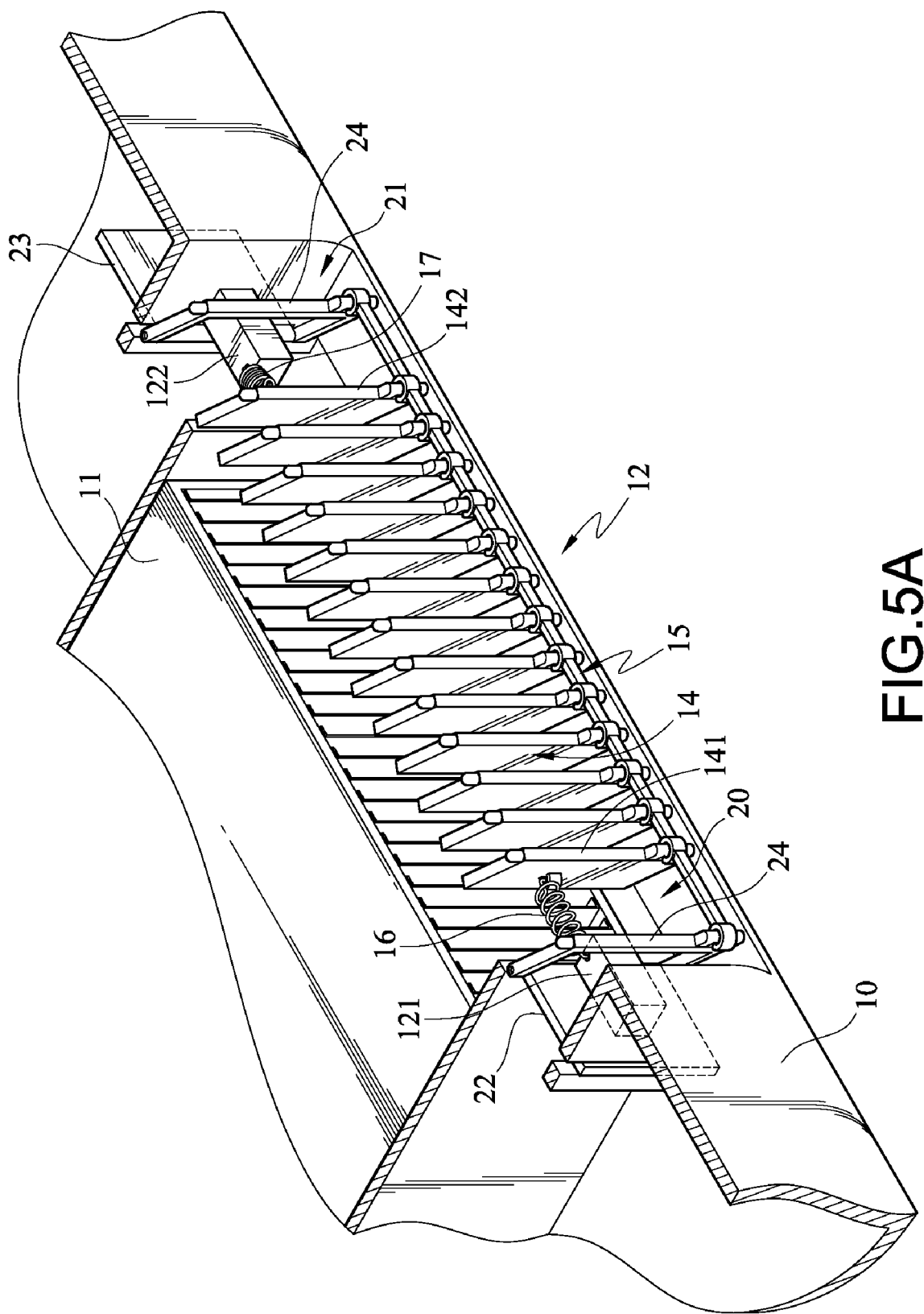
FIG. 5A is a schematic view of a structure of a third embodiment of the present invention.

FIG. 5A is a schematic view of a structure of a third embodiment of the present invention. Referring to FIG. 5A, as for an exhaust device according to the third embodiment of the present invention, the structure thereof is approximately the same as that of the first embodiment, except that a right convection channel 20 and a left convection channel 21 are respectively added on the two sides of the air flow channel 12, and a right conductive element 121 and a left conductive element 122 are respectively installed on the inner wall surfaces on the left and right sides of the air flow channel 12, and the conductive elements 121 and 122 are copper, aluminum, or other thermal conductive metals. The exhaust device further includes a right air damper 22 and a left air damper 23, and the air dampers 22 and 23 are respectively connected to the braking part 15 through the frame 24, such that the air dampers 22 and 23 are interlocked with the vanes 14, that is, the air dampers 22 and 23 may swing back and forth in the convection channels 20 and 21 as the vanes 14 are located on the right outlet position or the left outlet position. One end of the first memory deformable element 16 is connected to the right vane 141, and the other end is fixedly disposed on the right conductive element 121. One end of the second memory deformable element 17 is connected to the left vane 142, and the other end is fixedly disposed on the left conductive element 122.

Figure 5B:
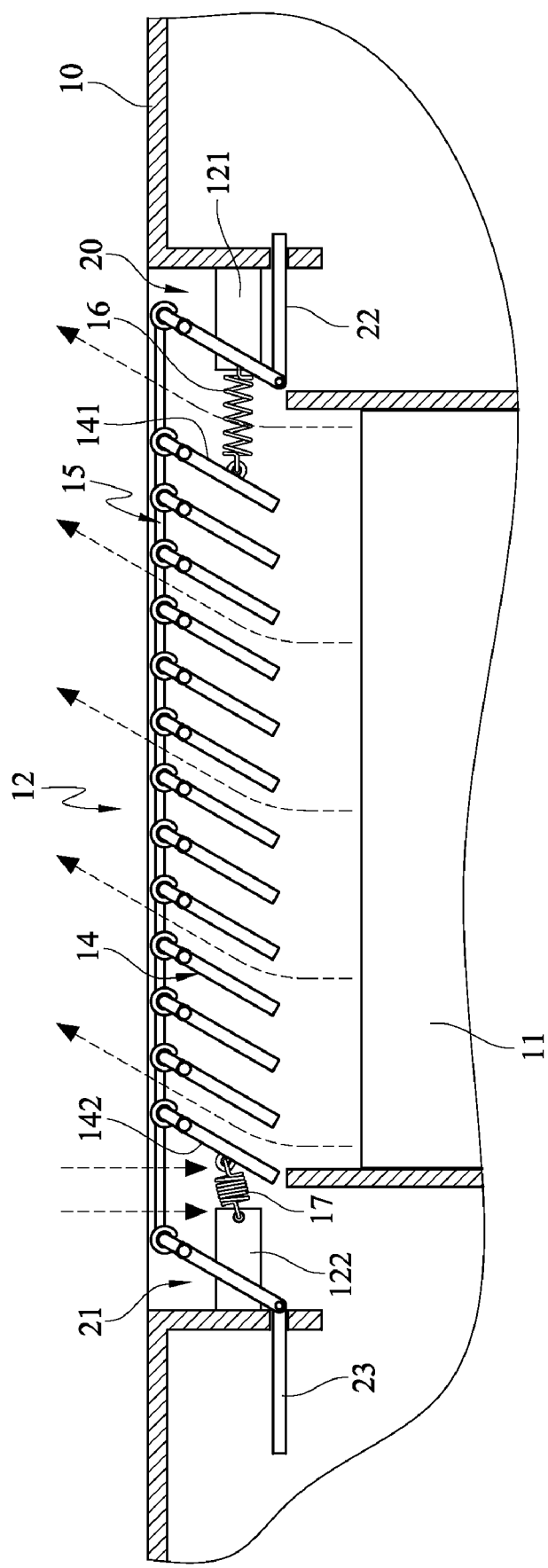
FIGS. 5B and 5C are schematic views of usage of the third embodiment of the present invention.
Figure 5C:
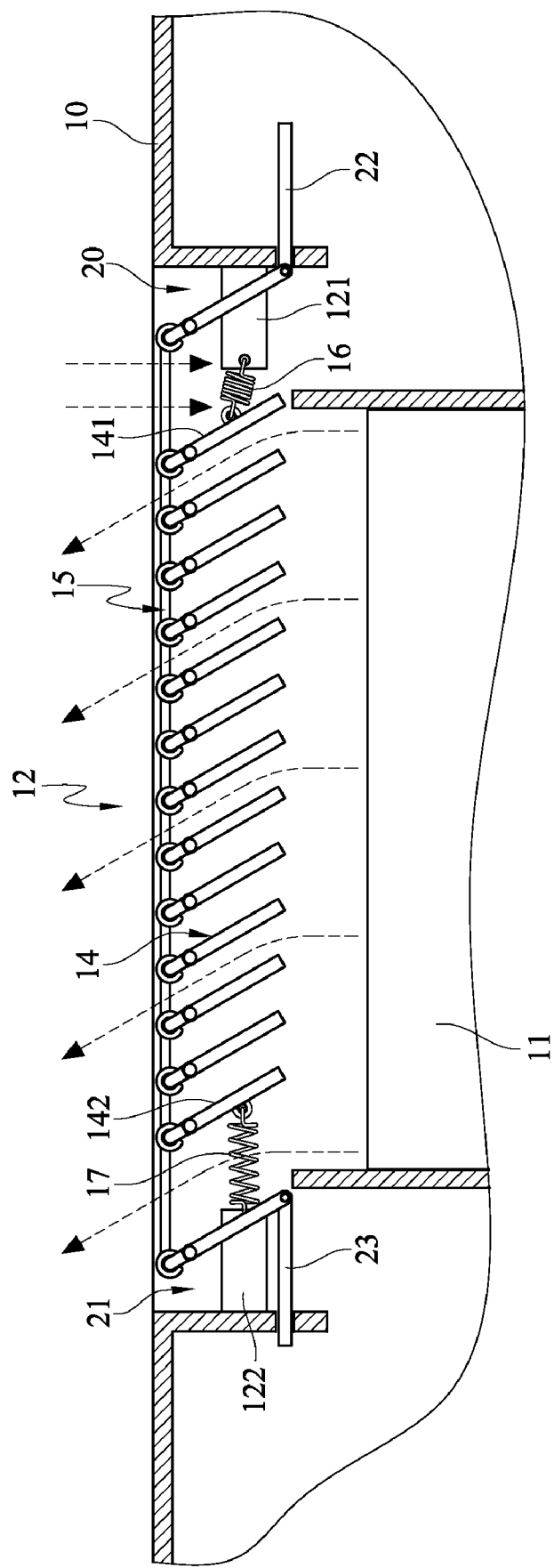

Referring to FIGS. 5B and 5C, when the second memory deformable element 17 pulls the left vane 142 to drive the vanes 14 to be located on the right outlet position, the second memory deformable element 17 drives the right air damper 22 together to shield the right convection channel 20. At this time, the hot air is exhausted from the right outlet position, and contacts the first memory deformable element 16. Through a natural convection effect, the ambient cold air enters the host 10 via the left convection channel 21, and cools the second memory deformable element 17 and the left conductive element 122, and the cooling speed of the second memory deformable element 17 is quickened through a heat conduction effect between the left conductive element 122 on the inner wall surface of the air flow channel and the second memory deformable element.

When the first memory deformable element 16 is heated by the hot air and reaches the transition temperature, the first memory deformable element 16 restores the shrunk/restored state from the stretched/deformed state and pulls the right vane 141, so that the vanes 14 are driven to swing together towards the left outlet position, and the left air damper 23 is driven to shield the left convection channel 21. At this time, the hot air is exhausted from the left outlet position, and through the natural convection effect, the ambient cold air enters the host 10 via the right convection channel 20, and cools the first memory deformable element 16 and the right conductive element 121, and a cooling speed of the first memory deformable element 16 is quickened through a heat conduction effect of the right conductive element 121.

In addition, in the exhaust device according to the present invention, one of the first memory deformable element 16 and the second memory deformable element 17 is replaced by an extension spring, such that each vane may also swing back and forth in the air flow channel. Under a normal state, the extension spring is in a shrunk/restored state and generates a pre-stress that is smaller than a shrink restoration force of the memory deformable element in a heated state and larger than a stretch deforming force of the memory deformable element in a normal temperature state. In the following illustrations, the second memory deformable element in the first embodiment is for example replaced by an extension spring.

Figure 6A:
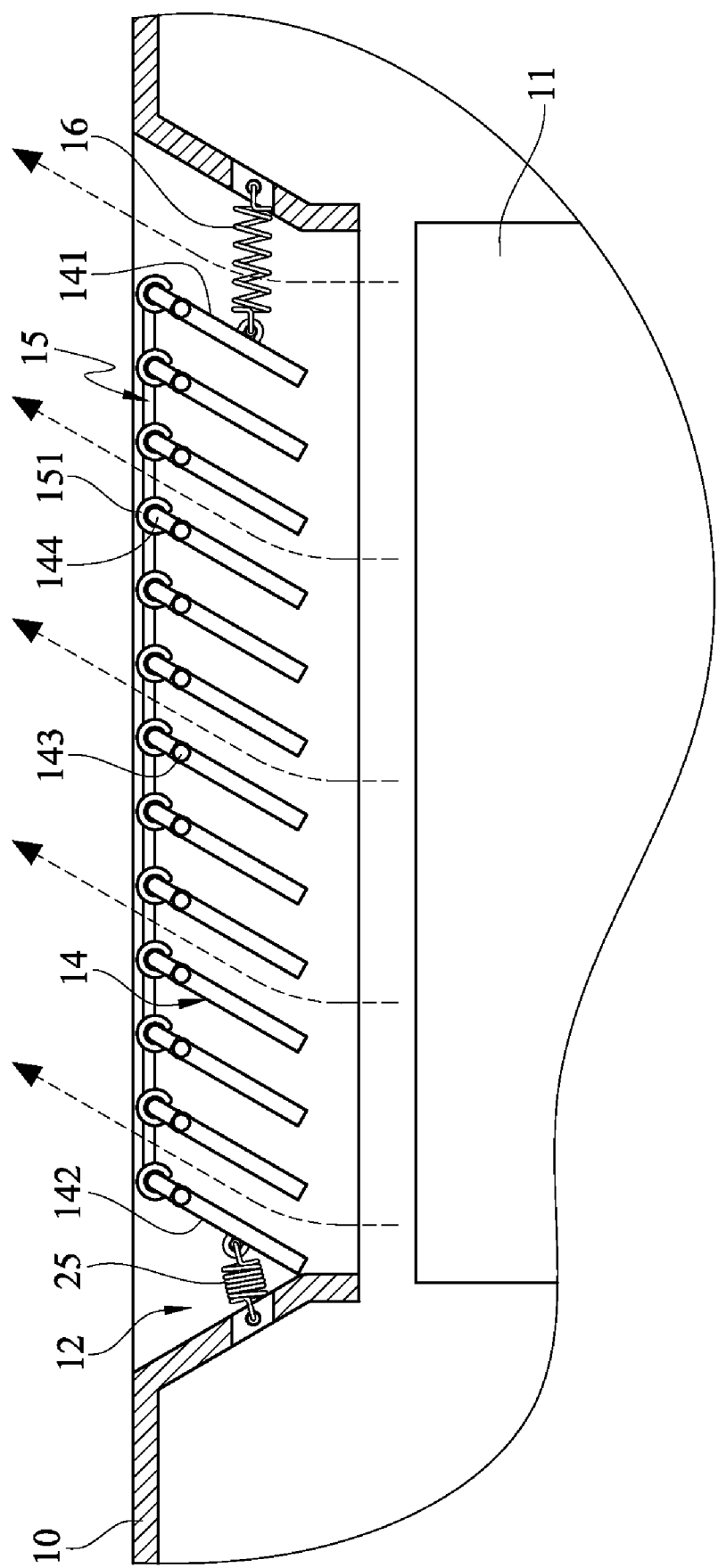
FIGS. 6A and 6B are schematic views of motions of a fourth embodiment of the present invention.
Figure 6B:
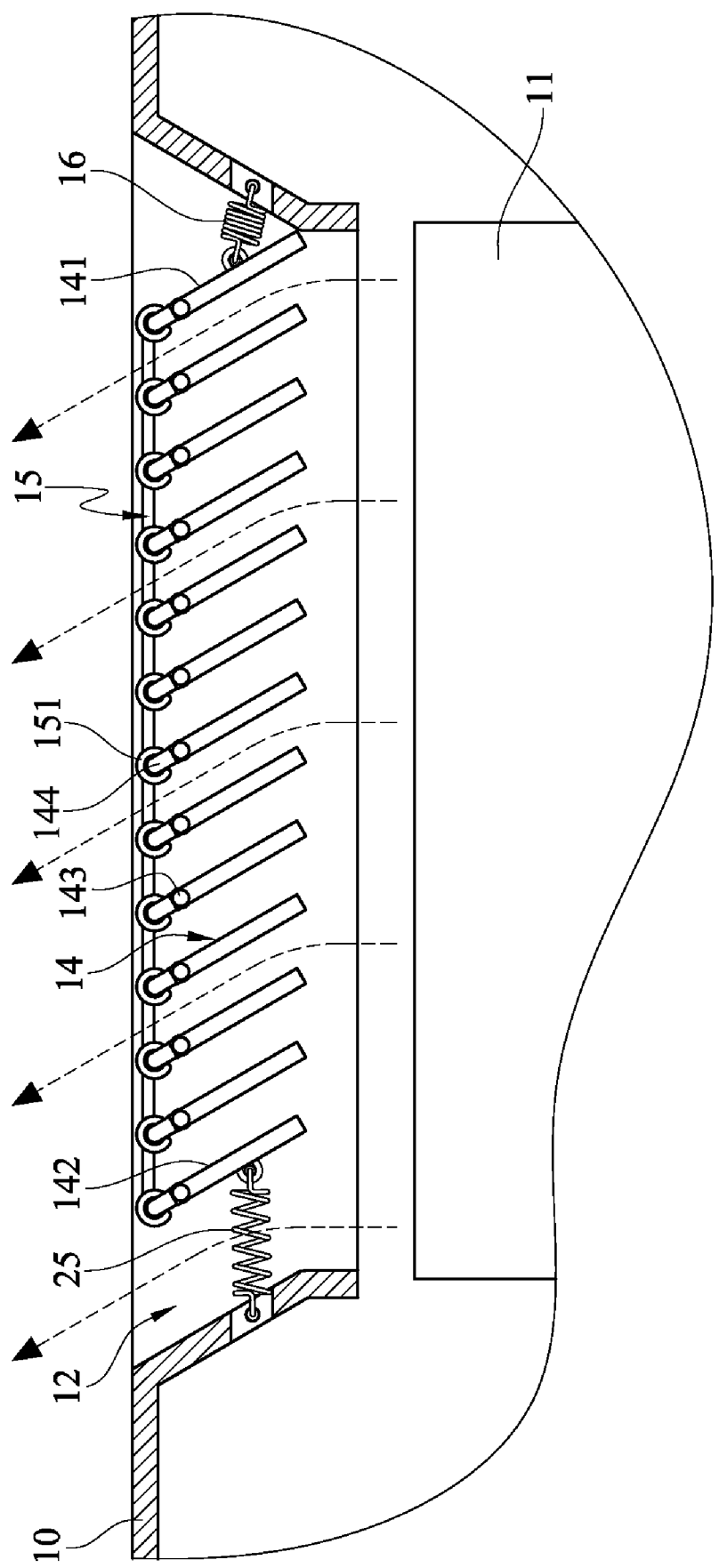

FIGS. 6A and 6B are schematic views of motions of a fourth embodiment of the present invention. In the fourth embodiment of the present invention, the second memory deformable element 17 in the first embodiment is replaced by an extension spring 25. Therefore, in the fourth embodiment of the present invention, one end of the first memory deformable element 16 is connected to the right vane 141, and the other end is fixedly disposed on the inner wall surface of the air flow channel 12 close to the right vane 141. One end of the extension spring 25 is connected to the left vane 142, and the other end is fixedly disposed on the inner wall surface of the air flow channel 12 close to the left vane 142.

The extension spring 25 is normally in the shrunk/restored state and pulls the left vane 142, such that the vanes 14 are maintained on the right outlet position. The pre-stress of the extension spring 25 is larger than the stretch deforming force of the first memory deformable element 16, so that the extension spring 25 pulls the left vane 142 to drive each vane 14 to rotate, and thus, the first memory deformable element 16 is in the stretched/deformed state (as shown in FIG. 6A).

When the notebook computer begins to operate, the hot air is exhausted to the exterior through the air flow channel 12. Upon being guided by the vanes 14, the hot air is exhausted towards the right outlet position, and continuously contacts the first memory deformable element 16, such that the first memory deformable element 16 is in the heated state. When the temperature of the first memory deformable element 16 reaches the transition temperature, the first memory deformable element 16 is deformed to shrink to the shrunk/restored state, such that the first memory deformable element 16 pulls the right vane 141, and drives the vanes 14 through the braking part 15 to swing together to reach the left outlet position, so as to change the flowing direction of the hot air flow, and thus, the hot air flow is changed to be exhausted from the left outlet position. Meanwhile, the right vane 141 is made to lean against the side edge of the inner wall surface of the air flow channel 12 and shields the first memory deformable element 16, thereby preventing the first memory deformable element 16 from being turned into the heated state (as shown in FIG. 6B).

After the first memory deformable element 16 is cooled due to being shielded by the right vane 141, as the pre-stress of the extension spring 25 is larger than the stretch deforming force of the first memory deformable element 16, the extension spring 25 restores the shrunk/restored state again, and pulls the left vane 142 to drive the vanes 14 to rotate towards the right outlet position. Through the right vane 141, the first memory deformable element 16 is pulled to the stretched/deformed state once again.

Figure 7A:
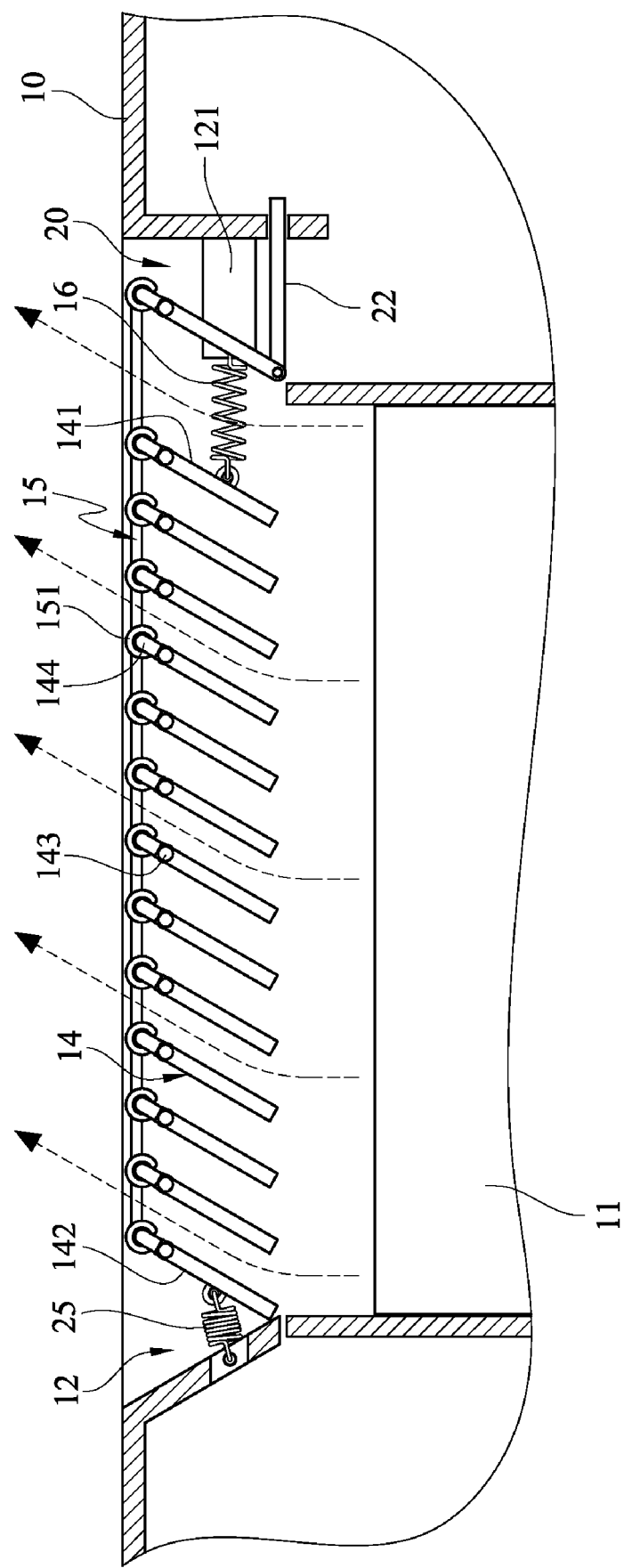
FIGS. 7A and 7B are schematic views of motions of the fourth embodiment of the present invention having convection channels and air dampers.
Figure 7B:
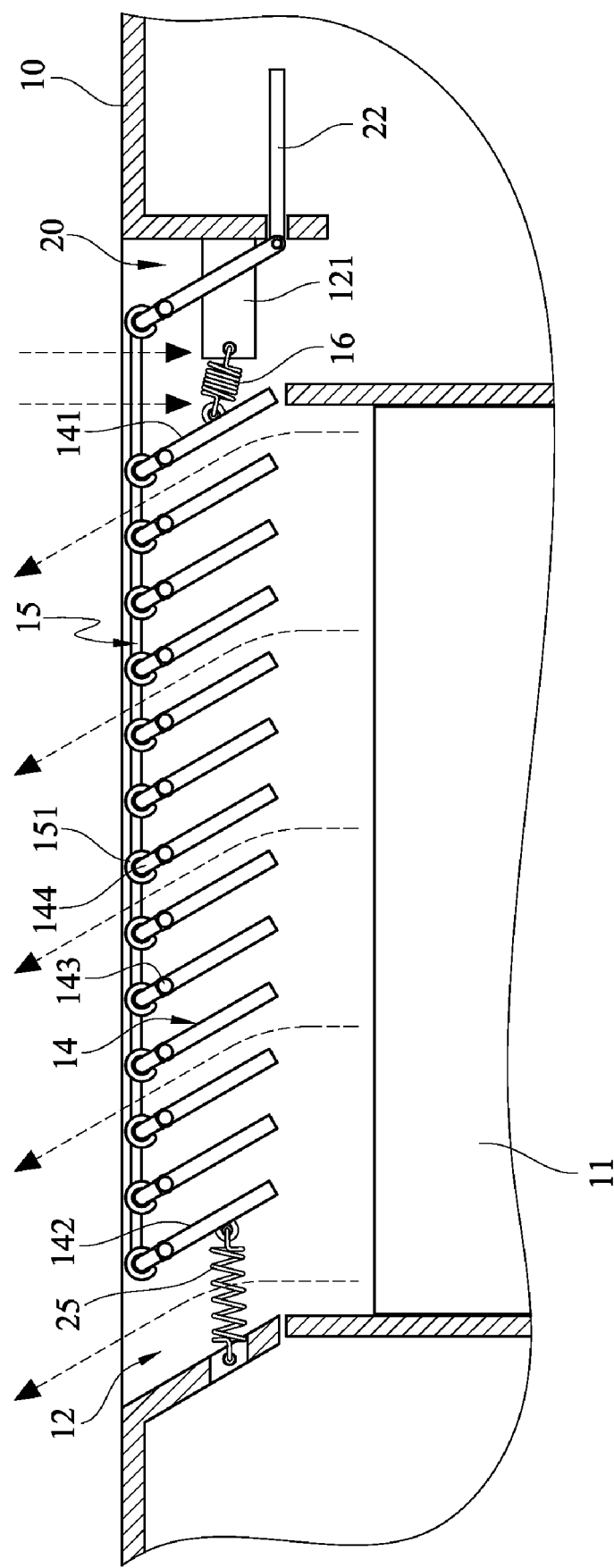

As shown in FIGS. 7A and 7B, in the fourth embodiment of the present invention, similar to the exhaust device according to the third embodiment of the present invention, a right convection channel 20 and a right conductive element 121 are disposed in the air flow channel 12. Meanwhile, the exhaust device is further provided with a right air damper 22, and the right air damper 22 is connected to the braking part 15 through the frame 24, such that the right air damper 22 is interlocked with the vanes 14, that is, the right air damper 22 may swing back and forth in the convection channel 20 as the vanes 14 are located on the right outlet position or the left outlet position. Through the heat conduction effect of the right convection channel 20 and the right conductive element 121, the cooling speed of the first memory deformable element 16 is quickened, such that a swinging frequency of the vanes 14 in the air flow channel 12 is increased.

The exhaust device of the present invention includes a plurality of vanes that is rotatable and interlocked with each other, a first memory deformable element, and a second memory deformable element. When the electronic device begins to operate and produces a hot air flow, the first memory deformable element and the second memory deformable element are alternately switched between the stretched/deformed state and the shrunk/restored state through the hot air flow, and accordingly, each vane is pulled to swing back and forth between the left outlet position and the right outlet position. Therefore, each vane of the electronic device located in the air flow channel achieves an effect of swinging back and forth without requiring any additional electrical device or through a manual manner.

Meanwhile, in the exhaust device of the present invention, one of the first memory deformable element and the second memory deformable element may be replaced by an extension spring. The pre-stress of the extension spring is smaller than the shrink restoration force of the memory deformable element and larger than the stretch deforming force of the memory deformable element, and the memory deformable element may be restored after being heated, such that each vane is made to swing back and forth in the air flow channel, and thus the electronic device automatically changes the exhaust direction.

What is claimed is:

1. An exhaust device, disposed on an air flow channel provided for a hot air flow to pass there through, comprising:
a plurality of vanes, disposed on the air flow channel in such a manner that the vanes are rotatable and interlocked with each other, wherein the plurality of vanes comprises a left vane and a right vane located on two sides, and has a left outlet position and a right outlet position;
a first memory deformable element, connected to the right vane, wherein when the vanes are located on the left outlet position, the right vane shields the first memory deformable element; and
a second memory deformable element, connected to the left vane, wherein when the vanes are located on the right outlet position, the left vane shields the second memory deformable element;
wherein the first memory deformable element and the second memory deformable element are alternately shielded by the right vane or the left vane, or alternately heated by the hot air flow, such that the first memory deformable element and the second memory deformable element are alternately deformed or restored, so as to drive the vanes to rotate and swing back and forth between the left outlet position and the right outlet position to allow automatic changing of an exhaust direction for the hot airflow out of the airflow channel.

2. The exhaust device according to claim 1, further comprising a linking part, connected to the vanes, so as to drive the vanes to swing together.

3. The exhaust device according to claim 2, wherein:
each vane includes a respective connecting portion;
the linking part includes a plurality of sleeves corresponding to the respective connecting portions of the vanes;
the connecting portion of each vane is pivoted to a corresponding one of the plurality of sleeves; and
the linking part synchronizes the rotations of the vanes when the first memory deformable element and the second memory deformable element rotate the left and right vanes.

4. The exhaust device according to claim 1, wherein a plurality of sleeve holes is respectively disposed on a top end and a bottom end of an inner wall surface of the air flow channel, a pair of rotating shafts are respectively disposed on a top end and a bottom end of each vane, and the vanes are enabled to rotate via placement of the rotating shafts in the sleeve holes.

5. The exhaust device according to claim 2, further comprising a right air damper and a left air damper, wherein the air dampers have a frame connected to the braking part, the air flow channel comprises a right convection channel and a left convection channel, when the vanes are located on the right outlet position, the right air damper shields the right convection channel, and when the vanes are located on the left outlet position, the left air damper shields the left convection channel.

6. The exhaust device according to claim 5, wherein the air flow channel further comprises a right conductive element and a left conductive element, one end of the right conductive element is connected to the first memory deformable element, the other end thereof is connected to an inner wall surface of the air flow channel, one end of the left conductive element is connected to the second memory deformable element, and the other end thereof is connected to the other inner wall surface of the air flow channel that is not connected to the right conductive element.

7. The exhaust device according to claim 6, wherein the conductive element is a thermal conductive metal.

8. The exhaust device according to claim 2, wherein:
each vane includes a respective connecting portion;
the linking part includes a plurality of sleeves corresponding to the respective connecting portions of the vanes;
the connecting portion of each vane is pivoted to a corresponding one of the plurality of sleeves;
the linking part synchronizes the rotations of the vanes when the first memory deformable element and the second memory deformable element rotate the left and right vanes;
a plurality of sleeve holes is respectively on a top end and a bottom end of an inner wall surface of the air flow channel;
a pair of rotating shafts are respectively on a top end and a bottom end of each vane; and
the vanes are enabled to rotate via placement of the rotating shafts in the sleeve holes.

* * * * *